(12) United States Patent
Yoshikawa et al.

(10) Patent No.: US 12,522,185 B2
(45) Date of Patent: Jan. 13, 2026

(54) CONTROL DEVICE, CONTROL METHOD, AND STORAGE MEDIUM STORING CONTROL PROGRAM

(71) Applicant: HONDA MOTOR CO., LTD., Tokyo (JP)

(72) Inventors: Fumiaki Yoshikawa, Tokyo (JP); Makoto Bessho, Tokyo (JP); Takeshi Iijima, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 153 days.

(21) Appl. No.: 18/539,935

(22) Filed: Dec. 14, 2023

(65) Prior Publication Data

US 2025/0196820 A1 Jun. 19, 2025

(51) Int. Cl.
*B60T 7/20* (2006.01)

(52) U.S. Cl.
CPC .................... *B60T 7/203* (2013.01)

(58) Field of Classification Search
CPC ....................................................... B60T 7/203
See application file for complete search history.

(56) References Cited

U.S. PATENT DOCUMENTS

| | | | | |
|---|---|---|---|---|
| 2,921,652 A | * | 1/1960 | Smith | B60T 7/203 |
| | | | | 188/112 R |
| 10,093,313 B2 | * | 10/2018 | Araki | B60T 7/045 |
| 10,538,225 B2 | * | 1/2020 | Mannherz | B60T 8/885 |
| 10,933,845 B2 | * | 3/2021 | Alexander | B60T 7/085 |
| 11,541,854 B2 | * | 1/2023 | Bultman | B60T 8/17 |
| 11,926,314 B2 | * | 3/2024 | Inoue | B60W 30/06 |
| 12,344,207 B2 | * | 7/2025 | Wei | B60W 30/18027 |
| 2004/0090112 A1 | * | 5/2004 | Tachiiri | B60T 7/107 |
| | | | | 303/20 |
| 2005/0006952 A1 | * | 1/2005 | Kohler | B60D 1/62 |
| | | | | 188/1.11 R |
| 2005/0264099 A1 | | 12/2005 | Kamiya et al. | |
| 2011/0012421 A1 | * | 1/2011 | Bensch | B60T 13/662 |
| | | | | 701/78 |
| 2013/0275019 A1 | * | 10/2013 | Murata | B60T 7/22 |
| | | | | 701/70 |
| 2014/0350816 A1 | * | 11/2014 | Tahara | B60T 7/042 |
| | | | | 701/70 |
| 2019/0084569 A1 | * | 3/2019 | Shibata | B60W 10/184 |
| 2019/0256061 A1 | * | 8/2019 | Nemeth | B60T 7/12 |
| 2024/0326530 A1 | * | 10/2024 | Imai | B60D 1/36 |
| 2024/0376978 A1 | * | 11/2024 | Kotloski | B60T 13/22 |

* cited by examiner

*Primary Examiner* — Carl C Staubach
(74) *Attorney, Agent, or Firm* — Paratus Law Group, PLLC

(57) ABSTRACT

A control device includes a calculation unit that performs movement control of a moving object, an ESB that adjusts a moving speed of the moving object, and an EPB that adjusts the moving speed of the moving object and is different from the ESB. The calculation unit adjusts, when the moving object is moved by the movement control, the moving speed of the moving object by a braking force of the ESB while applying a braking force of at least one of the ESB and EPB that fixes the moving object, and performs, when the moving object is no longer moved by the movement control, braking control to release the braking force of the EPB and stop the moving object by the ESB and the EPB.

18 Claims, 10 Drawing Sheets

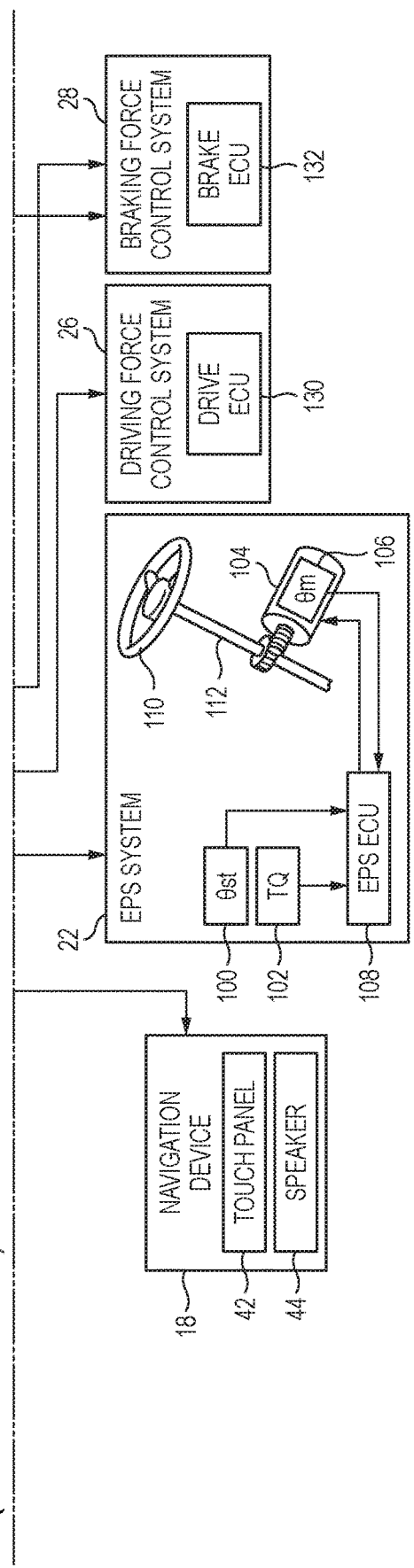

CONTROL DEVICE, CONTROL METHOD, AND STORAGE MEDIUM STORING CONTROL PROGRAM

TECHNICAL FIELD

The present invention relates to a control device, a control method, and a storage medium storing a control program.

BACKGROUND ART

In recent years, efforts have become active to provide access to a sustainable transport system that considers the most vulnerable of transport participants. To achieve such goal, inventors are focusing on research and development that will further improve traffic safety and convenience through research and development on autonomous driving technology.

In the related arts, a remote parking system has been known that remotely controls a vehicle to park the vehicle in a designated predetermined parking space or to take the vehicle out of a parking space. For example, US2005/264099 discloses a parking assist braking system that includes a first brake (hydraulic brake activated by normal pedal operation) used during parking assistance, and a second brake (electric parking brake: EPB) that brakes regardless of driver's intention, and generates a braking force using the second brake to drive/stop the vehicle at a predetermined speed according to parking assist control when an abnormality is detected in the first brake.

Incidentally, parking assistance may be performed when the vehicle is loaded with a heavy object, for example, or is located on a slope. When, for example, an abnormality occurs in a brake of the vehicle in a state as described above that is different from normal times, parking assist control is required to drive/stop the vehicle according to the state different from normal times. However, a parking assist brake device of US2005/264099 does not describe parking assist control using the second brake when an abnormality in the first brake is detected in a state different from normal times, such as when the vehicle is loaded with a heavy object or located on a slope. Therefore, there is room for improvement in parking assist control for a vehicle in a state different from normal times.

An object of the present invention is to provide a control device, a control method, and a storage medium storing a control program that can stop a moving object appropriately. This, in turn, contributes to development of a sustainable transportation system.

SUMMARY OF INVENTION

According to an aspect of the present invention, there is provided a control device of a moving object including:
a control unit that performs movement control of the moving object;
a first braking unit that adjusts moving speed of the moving object; and
a second braking unit that adjusts the moving speed of the moving object and different from the first braking unit,
in which
the control unit
adjusts, when the moving object is moved by the movement control, the moving speed of the moving object by a braking force of the first braking unit while applying a braking force of at least one of the first braking unit and the second braking unit that fixes the moving object, and
performs, when the moving object is no longer moved by the movement control, braking control to release the braking force of the second braking unit and stop the moving object by the first braking unit and the second braking unit.

According to another aspect of the present invention, there is provided a control method for a control device that includes a control unit that performs movement control of a moving object, a first braking unit that adjusts moving speed of the moving object, and a second braking unit that adjusts the moving speed of the moving object and is different from the first braking unit, the control method including executing on a processor of the control device steps of:
adjusting, when the moving object is moved by the movement control, the moving speed of the moving object by a braking force of the first braking unit while applying a braking force of at least one of the first braking unit and the second braking unit that fixes the moving object, and
performing, when the moving object is no longer moved by the movement control, braking control to release the braking force of the second braking unit and stop the moving object by the first braking unit and the second braking unit.

According to another aspect of the present invention, there is provided a storage medium that stores a control program for a control device that includes a control unit that performs movement control of a moving object, a first braking unit that adjusts moving speed of the moving object, and a second braking unit that adjusts the moving speed of the moving object and is different from the first braking unit, the control program including instructions for causing a processor of the control device to execute steps of:
adjusting, when the moving object is moved by the movement control, the moving speed of the moving object by a braking force of the first braking unit while applying a braking force of at least one of the first braking unit and the second braking unit that fixes the moving object, and
performing, when the moving object is no longer moved by the movement control, braking control to release the braking force of the second braking unit and stop the moving object by the first braking unit and the second braking unit.

DESCRIPTION OF EMBODIMENTS

Figure 1:
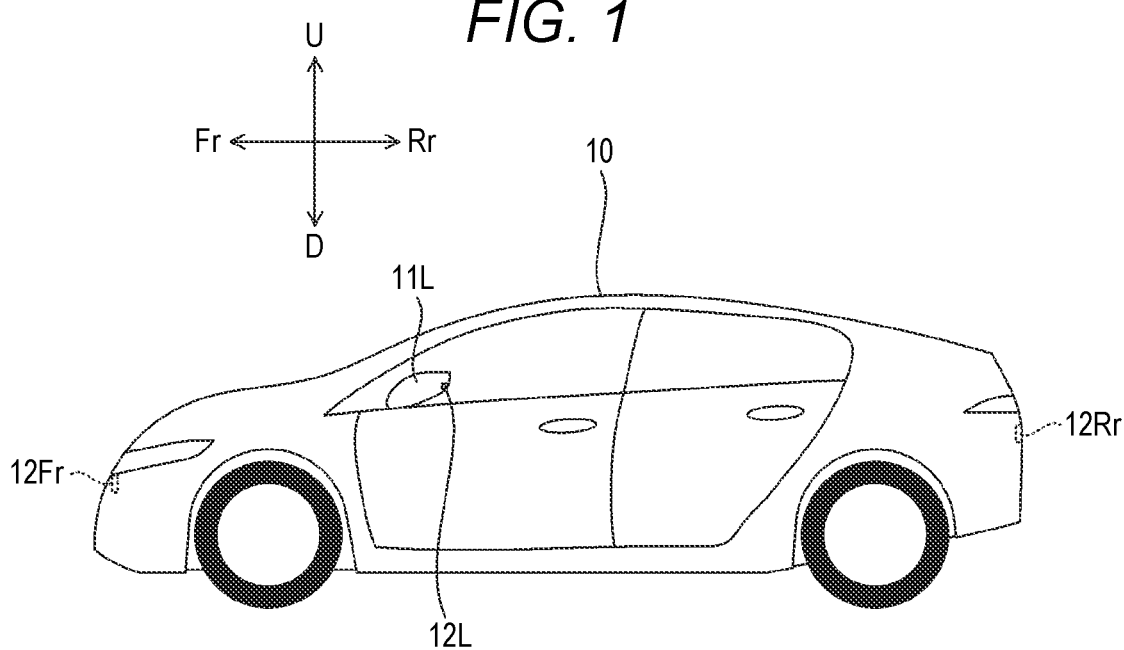
FIG. 1 is a side view illustrating an example of a vehicle equipped with a control device of the present invention.

An embodiment of a control device, a control method, and a storage medium storing a control program of the present invention will be described below with reference to the accompanying drawings. The drawings should be viewed in a direction of symbols. In the present specification and the like, to simplify and clarify the description, front and rear, left and right, and up and down directions are described according to directions seen from a driver of a vehicle 10 illustrated in FIGS. 1 and 2. In the drawings, the front of the vehicle 10 is shown as Fr, the rear as Rr, the left side as L, the right side as R, the upper side as U, and the lower side as D.

Vehicle 10 Equipped with Control Device of Present Invention

Figure 2:
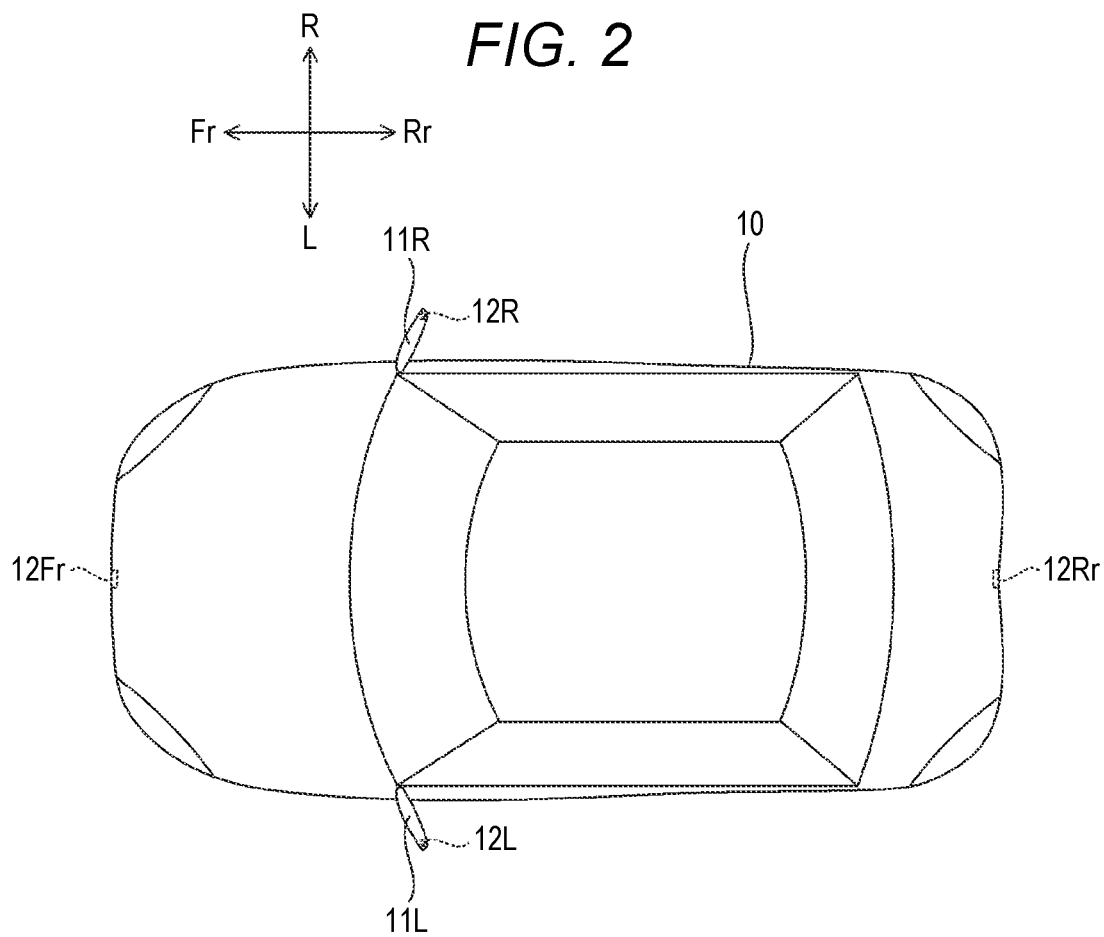
FIG. 2 is a top view of the vehicle illustrated in FIG. 1.

FIG. 1 is a side view illustrating an example of a vehicle 10 equipped with a control device of the present invention. FIG. 2 is a top view of the vehicle 10 illustrated in FIG. 1. The vehicle 10 is an example of a "moving object" of the present invention.

The vehicle 10 is an automobile that includes a drive source (not illustrated) and wheels including drive wheels driven by power of the drive source and steerable wheels. In the present embodiment, the vehicle 10 is a four-wheeled automobile having a pair of left and right front wheels and a pair of left and right rear wheels. The drive source of the vehicle 10 is, for example, an electric motor. The drive source of the vehicle 10 may be an internal combustion engine such as a gasoline engine or a diesel engine, or may be a combination of an electric motor and an internal combustion engine. The drive source of the vehicle 10 may drive the pair of left and right front wheels, the pair of left and right rear wheels, or four wheels of the pairs of left and right front wheels and rear wheels. Both of the front wheels and the rear wheels may be steerable wheels, or one pair of the wheels may be steerable wheels.

The vehicle 10 further includes side mirrors 11L and 11R. The side mirrors 11L and 11R are mirrors (rearview mirrors) provided on the outside of front seat doors of the vehicle 10 for the driver to check the rear and rear sides. The side mirrors 11L and 11R are each fixed to a main body of the vehicle 10 by vertically extending rotation shafts, and can be opened and closed by rotating around the rotation shafts.

The vehicle 10 further includes a front camera 12Fr, a rear camera 12Rr, a left side camera 12L, and a right side camera 12R. The front camera 12Fr is a digital camera that is provided in the front of the vehicle 10 and captures an image in a front of the vehicle 10. The rear camera 12Rr is a digital camera that is provided at the rear of the vehicle 10 and captures an image of a rear of the vehicle 10. The left side camera 12L is a digital camera that is provided on the left side mirror 11L of the vehicle 10 and captures an image of the left side of the vehicle 10. The right side camera 12R is a digital camera that is provided on the right side mirror 11R of the vehicle 10 and captures an image of the right side of the vehicle 10.

Internal Configuration of Vehicle 10

Figure 3:
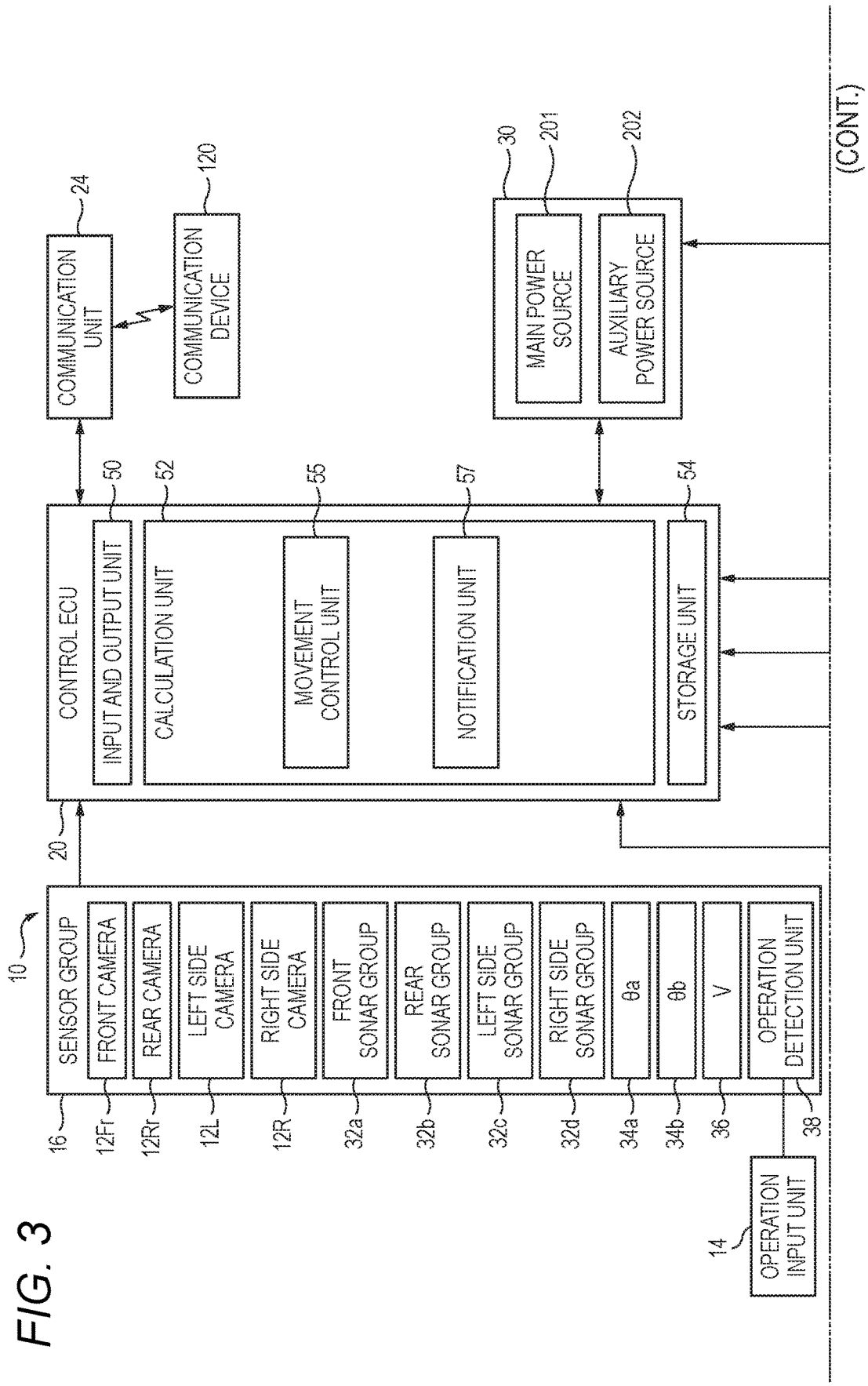
FIG. 3 is a block diagram illustrating an example of an internal configuration of the vehicle illustrated in FIG. 1.

FIG. 3 is a block diagram illustrating an example of an internal configuration of the vehicle 10 illustrated in FIG. 1. As illustrated in FIG. 3, the vehicle 10 includes a sensor group 16, a navigation device 18, a control electronic control unit (ECU) 20, an electric power steering (EPS) system 22, and a communication unit 24. The vehicle 10 also includes a driving force control system 26, a braking force control system 28, and a power source 30.

The sensor group 16 acquires various detected values used for control by the brake ECU 20. The sensor group 16 includes the front camera 12Fr, the rear camera 12Rr, the left side camera 12L, and the right side camera 12R. The sensor group 16 includes a front sonar group 32a, a rear sonar group 32b, a left side sonar group 32c, and a right side sonar group 32d. The sensor group 16 includes wheel sensors 34a and 34b, a vehicle speed sensor 36, and an operation detection unit 38. The sensor group 16 may include a radar.

The front camera 12Fr, the rear camera 12Rr, the left side camera 12L, and the right side camera 12R capture images around the vehicle 10, thereby acquiring recognition data (for example, peripheral image data) for recognizing the outside world of the vehicle 10. Peripheral images captured by the front camera 12Fr, rear camera 12Rr, left side camera 12L, and right side camera 12R are respectively referred to as a front image, a rear image, a left side image, and a right side image. An image composed of a left side image and a right side image may be referred to as a side image. The recognized image around the vehicle, which is generated by combining the imaging data of the front camera 12Fr, the rear camera 12Rr, the left side camera 12L, and the right side camera 12R, may be referred to as an overhead image of the vehicle 10.

The front sonar group 32a, the rear sonar group 32b, the left sonar group 32c, and the right sonar group 32d emit sound waves around the vehicle 10 and receive reflected sounds from other objects. The front sonar group 32a includes, for example, four sonars. The sonars forming the front sonar group 32a are respectively provided at the diagonally left front, the front left, the front right, and the diagonally front right of the vehicle 10. The rear sonar group 32b includes, for example, four sonars. The sonar forming the rear sonar group 32b are respectively provided at the diagonally rear left, the rear left, the rear right, and the diagonally rear right of the vehicle 10. The left side sonar group 32c includes, for example, two sonars. The sonars forming the left side sonar group 32c are respectively provided at the front of a left side and the rear of the left side of the vehicle 10. The right side sonar group 32d includes, for example, two sonars. The sonars forming the right side sonar group 32d are respectively provided at the front of a right side and the rear of the right side of the vehicle 10.

The wheel sensors 34a and 34b detect rotation angles of the wheels of the vehicle 10. The wheel sensors 34a and 34b may be configured by angle sensors or displacement sensors. The wheel sensors 34a and 34b output detection pulses every time the wheels rotate by a predetermined angle. The detection pulses output from the wheel sensors 34a and 34b are used to calculate the rotation angle and a rotation speed of the wheels. A distance traveled by the vehicle 10 is calculated based on the rotation angle of the wheels. The wheel sensor 34a detects, for example, a rotation angle θa of a left rear wheel. The wheel sensor 34b detects, for example, a rotation angle θb of a right rear wheel.

The vehicle speed sensor 36 detects the speed of the vehicle body of the vehicle 10, that is, a vehicle speed V, and outputs the detected vehicle speed V to the brake ECU 20. The vehicle speed sensor 36 detects the vehicle speed V based on, for example, the rotation of a countershaft of a transmission. The sensor group 16 may also include, for example, a weight sensor that can measure the weight of an object connected to or mounted on the vehicle 10, and a tilt sensor that can measure the slope of a road surface on which the vehicle 10 is located.

The operation detection unit 38 detects the content of an operation performed by a user using an operation input unit 14, and outputs the detected content of the operation to the brake ECU 20. The operation input unit 14 includes various user interfaces such as a side mirror switch for switching an open and closed state of the side mirrors 11L and 11R, and a shift lever (select lever or selector).

The navigation device 18 uses, for example, a global positioning system (GPS) to detect a current position of the vehicle 10 and guides the user on a route to a destination. The navigation device 18 includes a storage device (not illustrated) provided with a map information database.

The navigation device 18 is equipped with a touch panel 42 and a speaker 44. The touch panel 42 functions as an input device and a display device for the brake ECU 20. The speaker 44 outputs various types of guidance information to the user of the vehicle 10 by voice.

The touch panel 42 is configured so that various commands to the brake ECU 20 can be input. For example, the user can input instructions regarding movement support for the vehicle 10 via the touch panel 42. Movement support includes parking support and exit support for the vehicle 10. The touch panel 42 is configured to display various screens related to control contents of the brake ECU 20. For example, a screen related to movement support for the vehicle 10 is displayed on the touch panel 42. Specifically, the touch panel 42 displays a parking support button that requests parking support for the vehicle 10 and an exit support button that requests exit support. The parking support button includes an automatic parking button that requests parking by automatic steering of the brake ECU 20, and an assistance parking button that requests assistance when parking by user operation. The exit support button includes an automatic exit button that requests exiting by automatic steering of the brake ECU 20, and an assistance exit button that requests assistance when exiting by user operation. Components other than the touch panel 42, such as a smartphone or a tablet terminal, may be used as the input device or the display device.

The power source 30 includes a main power source 201 and an auxiliary power source 202. The main power source 201 is a power source that supplies power to power equipment installed in the vehicle 10. For example, the main power source 201 supplies power to an anti-lock brake system (ABS) that is activated when braking suddenly, and an electric power steering (EPS) that is activated when a sudden steering is performed. The main power source 201 supplies power to an auto parking system (APS) for automatically parking the vehicle 10. The main power source 201 supplies power to an electric servo brake (ESB), a vehicle stability assistant (VSA), and an electric parking brake (EPB) that adjust (decelerate) the moving speed of the vehicle 10 or stop the vehicle 10. The main power source 201 is a power source that supplies (charges) power to the auxiliary power source 202 via a pass-through circuit.

The auxiliary power source 202 is a power source that supplies power to the VSA and the EPB when the main power source 201 fails. The auxiliary power source 202 is used to operate failsafe by operating the VSA and the EPB. The main power source 201 is, for example, a secondary battery such as a lithium ion battery, a nickel metal hydride battery, or a lead acid battery. The auxiliary power source 202 is, for example, an electric double layer capacitor. The main power source 201 and the auxiliary power source 202 are, for example, 12 V voltage. The power source 30 is connected to the brake ECU 20.

The control ECU 20 includes an input and output unit 50, a calculation unit 52, and a storage unit 54. The calculation unit 52 is configured by, for example, a central processing unit (CPU). The calculation unit 52 performs various controls by controlling each unit based on programs stored in the storage unit 54. The calculation unit 52 inputs and outputs signals to and from each unit connected to the brake ECU 20 via the input and output unit 50. The calculation unit 52 is an example of a "control unit" of the present invention.

The calculation unit 52 includes a movement control unit 55 that controls the movement of the vehicle 10, and a notification unit 57 that notifies the user of information regarding movement control.

The movement control unit 55 performs automatic parking support and automatic exit support for the vehicle 10 through automatic steering in which the operation of a steering wheel 110 is automatically performed under the control of the movement control unit 55. In the automatic parking support and the automatic exit support, an accelerator pedal (not illustrated), a brake pedal (not illustrated), and the operation input unit 14 are automatically operated. The movement control unit 55 also performs assistance parking support and assistance exit support when the user (driver) manually parks and manually exits the vehicle 10 by operating the accelerator pedal, the brake pedal, and the operation input unit 14. When performing the automatic parking support and the automatic exit support, the user may be in the vehicle 10, or the user may have gotten off the vehicle 10 and is outside.

For example, the movement control unit 55 performs movement control to move the vehicle 10 based on external recognition data of the vehicle 10 acquired by the front camera 12Fr, the rear camera 12Rr, the left side camera 12L, and the right side camera 12R, and a parking space specified by the user. The movement control includes parking control that automatically parks the vehicle 10 in a predetermined parking space (target parking position) and exit control that automatically moves the vehicle 10 to leave from a predetermined parking space to a target movement position. The movement control unit 55 can perform the parking control and the exit control according to instruction signals input from the outside via the input and output unit 50. The input from the outside includes input via wireless communication from an information terminal or the like carried by the user of the vehicle 10. The movement control unit 55 can transmit information regarding the parking control and the exit control to an external information terminal via the input and output unit 50.

When a failure related to movement control of the vehicle 10 is detected, the movement control unit 55 controls a braking unit of the vehicle 10 to stop the vehicle 10. The braking unit of the vehicle 10 includes, for example, the braking force control system 28, which will be described below. The movement control unit 55 transmits a failure detection signal to the notification unit 57 when a failure related to movement control is detected.

The notification unit 57 notifies the user when the vehicle 10 is no longer moved by movement control due to the detection of a failure regarding the movement control of the vehicle 10. Failures related to the movement control include failures in the ESB, failures in the power source that supplies power to the ESB, and the like. The power source includes the main power source 201 and the auxiliary power source 202. The notification unit 57 notifies the user that the vehicle 10 is no longer moved based on the failure detection signal from the movement control unit 55. The notifications include, for example, a notification that "the vehicle 10 will be stopped because a failure has occurred in the power source" and a notification regarding the user's response. The notification may be a notification to the driver of the vehicle 10, a notification to an administrator, or a notification to an external server.

The EPS system 22 includes a steering angle sensor 100, a torque sensor 102, an EPS motor 104, a resolver 106, and an EPS ECU 108. The steering angle sensor 100 detects a steering angle θst of the steering wheel 110. The torque sensor 102 detects torque TQ applied to the steering wheel 110.

The EPS motor 104 provides driving force or reaction force to a steering wheel column 112 connected to the steering wheel 110, thereby enabling operation support for the steering wheel 110 by an occupant and automatic steering during parking assistance. The resolver 106 detects a rotation angle θm of the EPS motor 104. The EPS ECU 108 is in charge of overall control of the EPS system 22. The EPS ECU 108 includes an input and output unit (not illustrated), a calculation unit (not illustrated), and a storage unit (not illustrated).

The communication unit 24 enables wireless communication with other communication devices 120. Other communication devices 120 include base stations, communication devices of other vehicles, and information terminals such as smartphones or tablet terminals that can be carried by the user of the vehicle 10. For example, the communication unit 24 includes a UWB interface for performing ultra-wideband (UWB: registered trademark) communication with an information terminal.

The driving force control system 26 includes a drive ECU 130. The driving force control system 26 performs driving force control of the vehicle 10. The drive ECU 130 controls the driving force of the vehicle 10 by controlling an engine (not illustrated) or the like based on a user's operation of an accelerator pedal (not illustrated). The drive ECU 130 controls the driving force of the vehicle 10 by controlling the engine or the like according to a set travel range of the vehicle 10.

The braking force control system 28 includes a brake ECU 132. The braking force control system 28 controls the braking force of the vehicle 10. The braking force control system 28 includes, for example, the ESB, which is an example of a "first braking unit" of the present invention, and the EPB and the VSA, which are examples of a "second braking unit" of the present invention. The brake ECU 132 controls the braking force of the vehicle 10 by controlling a brake mechanism (not illustrated) or the like based on a user's operation of a brake pedal (not illustrated). The brake ECU 132 controls the braking force of the vehicle 10 by controlling the ESB, the EPB, and the VSA. A device including the calculation unit 52, the ESB, the EPB, and the VSA is an example of a "control device" of the present invention.

Configuration of ESB and EPB of Vehicle 10

Figure 4:
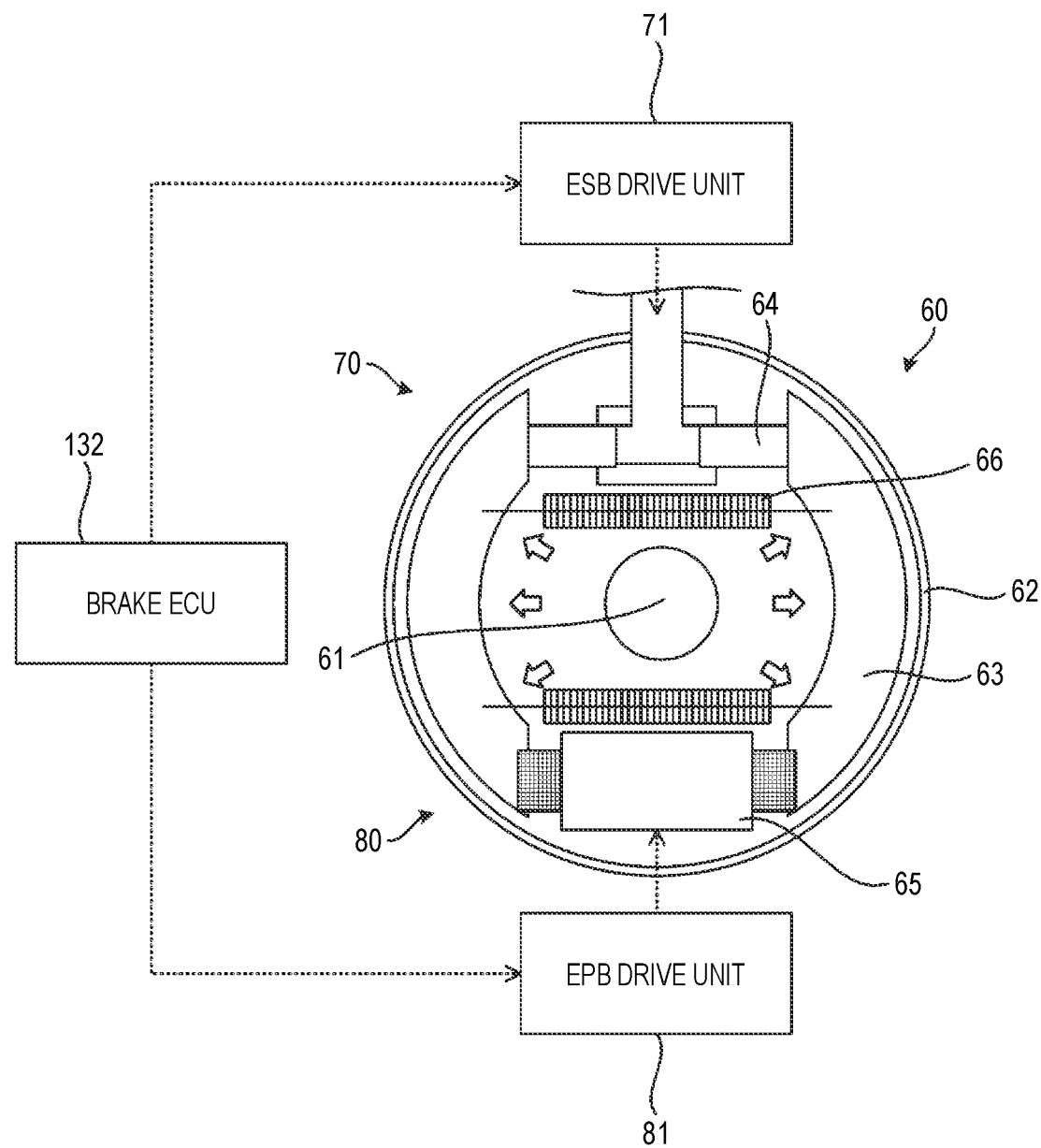
FIG. 4 is a diagram illustrating an example of configurations of ESB and EPB mounted on the vehicle.

FIG. 4 is a diagram illustrating an example of the configuration of the ESB and the EPB mounted on the vehicle 10. In the present example, the ESB and the EPB are illustrated when the brake of the vehicle 10 is a drum brake.

As illustrated in FIG. 4, a drum brake 60 includes a drive shaft 61, a brake drum 62, a brake shoe 63, a piston 64, a motor 65, and a spring 66. An ESB 70 in the drum brake 60 includes the brake drum 62, the brake shoe 63, the piston 64, and the spring 66. An EPB 80 in the drum brake 60 includes the brake drum 62, the brake shoe 63, the motor 65, and the spring 66. An ESB drive unit 71 is connected to the piston 64 of the ESB 70. An EPB drive unit 81 is connected to the motor 65 of the EPB 80. The brake ECU 132 is connected to the ESB drive unit 71 and the EPB drive unit 81.

The brake ECU 132 controls the braking force of the vehicle 10 by controlling the ESB drive unit 71 and the EPB drive unit 81. The ESB drive unit 71 controls an oil pressure of the ESB 70 based on a control signal from the brake ECU 132. The pressure based on the hydraulic control becomes a force that pushes the piston 64 in the brake. The piston 64 presses the brake shoe 63 against the inside of the brake drum 62, which rotates with the wheel. Rotation of the wheel is stopped by a frictional force generated when the brake shoe 63 is pressed against the inside of the brake drum 62, and the vehicle 10 is decelerated/stopped. When the pressure pushing the piston 64 decreases, the piston 64 is pushed back by the spring 66, and the brake shoe 63 is separated from the brake drum 62.

The EPB drive unit 81 controls the motor 65 of the EPS 80 based on a control signal from the brake ECU 132. A force generated by the control of the motor 65 presses the brake shoe 63 against the inside of the brake drum 62, which rotates with the wheel. Rotation of the wheel is stopped by a frictional force generated when the brake shoe 63 is pressed against the inside of the brake drum 62, and the vehicle 10 is decelerated/stopped. When the rotation of the motor 65 is stopped, the force pushing the brake shoe 63 is reduced, and the brake shoe 63 is pushed back by the spring 66 and separated from the brake drum 62.

The brake drum 62 that rotates with the wheel of the vehicle 10 is an example of a "first member" of the present invention. The brake shoe 63, which is provided on a main body of the vehicle 10 and does not rotate with the wheel, is an example of a "second member" of the present invention. By driving the EPB 80, the EPB drive unit 81 can break the vehicle 10 by changing the frictional force between the brake drum 62 and the brake shoe 63.

Although FIG. 4 illustrates a case where the brake of the vehicle 10 is the drum brake 60, the brake is not limited thereto. The brake of the vehicle 10 may be a disc brake, for example. In the case of a disc brake, a member that rotates with the wheel is a brake rotor, and a member that does not rotate with the wheel is a brake pad. The ESB 70 and the EPB 80 operate similarly also in the case of the disc brake.

Example of Movement Control of Vehicle 10

Figure 5:
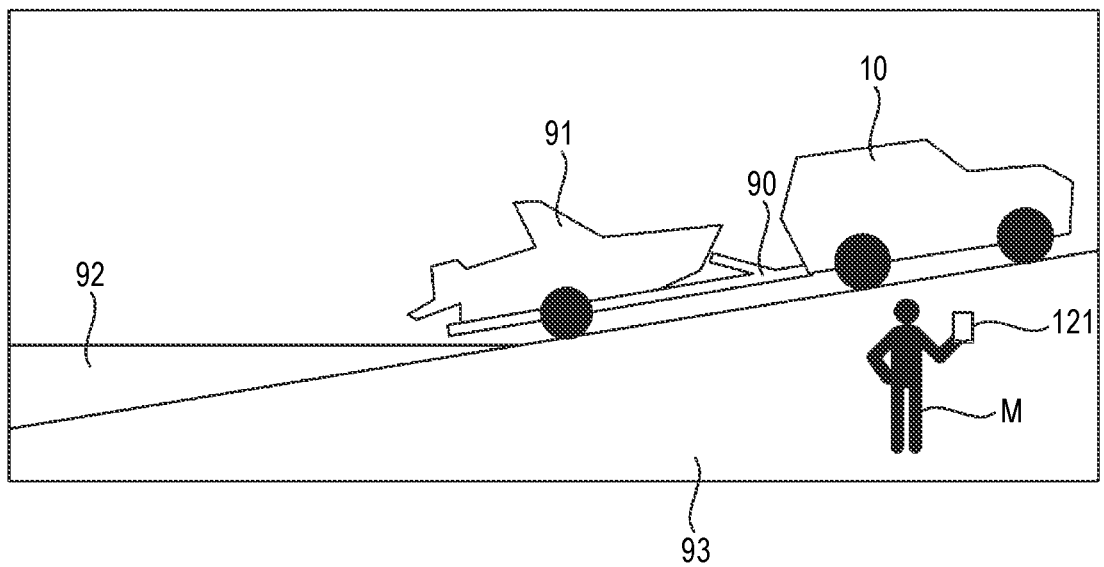
FIG. 5 is a diagram illustrating an example of how a vehicle towing a trailer is automatically parked.

Next, movement control of the vehicle 10 to which the present invention is applied will be described with reference to FIGS. 5 and 6. FIG. 5 is a diagram illustrating an example of how the vehicle 10 towing a trailer 90 is automatically parked. As illustrated in FIG. 5, an example of movement control to which the present invention is applied is automatic parking when the vehicle 10 towing the trailer 90 carrying a ship 91 such as a boat or jet ski backs up on a slope 93 for entering water provided in the sea, lake, or the like (in the present example, the water is set to sea 92) and allows the ship 91 to enter the water. Movement control of the vehicle 10 can be performed, for example, by remote control by a user M of the vehicle 10 using an information terminal 121 from outside the vehicle 10. Movement of the vehicle 10 can be performed by performing a touch operation (for example, a rotational swipe operation) on a display of the information terminal 121.

Figure 6:
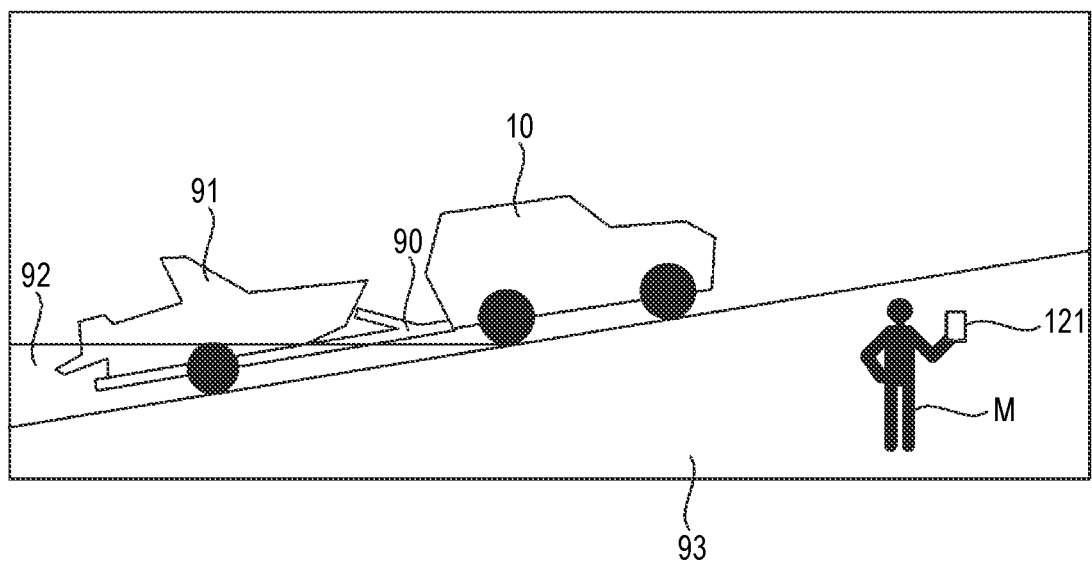
FIG. 6 is a diagram illustrating an example of how a ship enters the sea.

FIG. 6 is a diagram illustrating an example of how the ship 91 enters the sea 92. As illustrated in FIG. 6, the vehicle 10 is retreated along the slope 93 in a downhill direction, and the ship 91 is brought into the water to a position where the ship 91 can be separated from the trailer 90. A guideline for separating the ship 91 from the trailer 90 is, for example, when upper parts of tires of the trailer 90 are hidden in the water. The user M operates the information terminal 121 to move the vehicle 10 backward to a position where the upper parts of the tires of the trailer 90 are hidden in the water. The user M separates the ship 91 from the trailer 90, which has entered the water to a point where the ship 91 can be separated.

Figure 7:
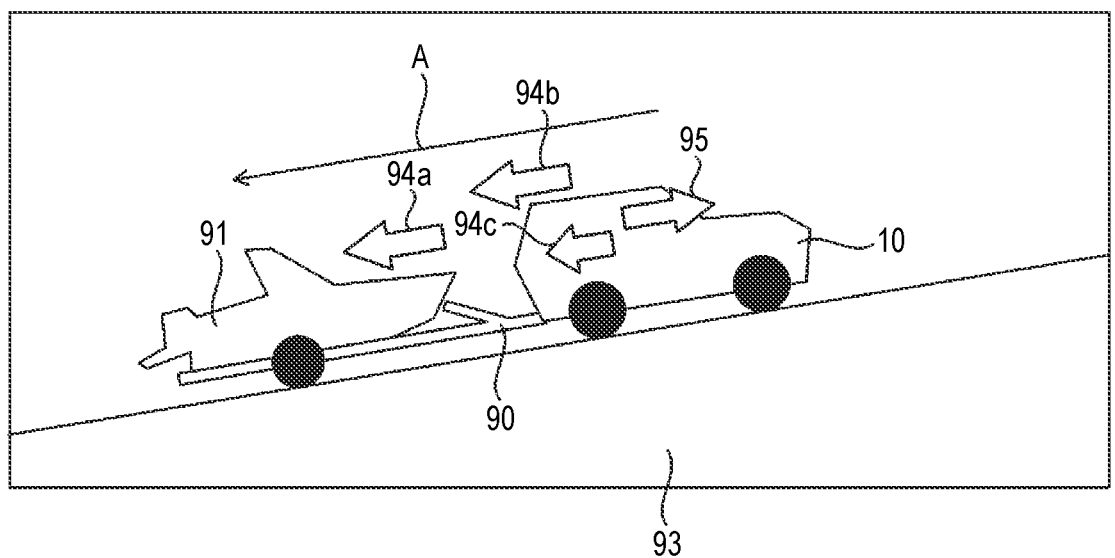
FIG. 7 is a diagram illustrating an example of driving force and braking force applied to a vehicle retreating in a downhill direction of a slope.

FIG. 7 is a diagram illustrating an example of driving force and braking force applied to the vehicle 10 retreating in the downhill direction of the slope 93. As illustrated in FIG. 7, it is assumed that the vehicle 10 is towing the trailer 90 carrying the ship 91 and is retreating on the slope 93 in the downhill direction indicated by an arrow A. Here, a driving force 94a of a traveling direction (downhill direction) component due to the weight of the trailer 90 carrying the ship 91, a driving force 94b of the traveling direction component due to the weight of the vehicle 10, a creep driving force 94c due to a traveling range R (reverse) of the vehicle 10, and a braking force 95 due to a braking force of the vehicle 10 are applied to the vehicle 10. The driving force 94a changes depending on the weight of the trailer 90 and the ship 91 and a gradient of the slope 93. The driving force 94b changes depending on the weight of the vehicle 10 and the gradient of the slope 93. As such, when the vehicle 10 towing the trailer 90 is located on the slope 93, the driving forces 94a and 94b in the downhill direction are additionally generated, which are not generated when the vehicle 10 is located on a flat road. Therefore, when controlling the movement of the vehicle 10 towing the trailer 90 in the downhill direction on the slope 93, movement control that considers the driving forces 94a and 94b is required.

Movement Control of Vehicle 10 by Calculation Unit 52

Next, movement control of the vehicle 10 by the calculation unit 52 of the vehicle 10 will be described with reference to FIGS. 8 to 10.

Figure 8:
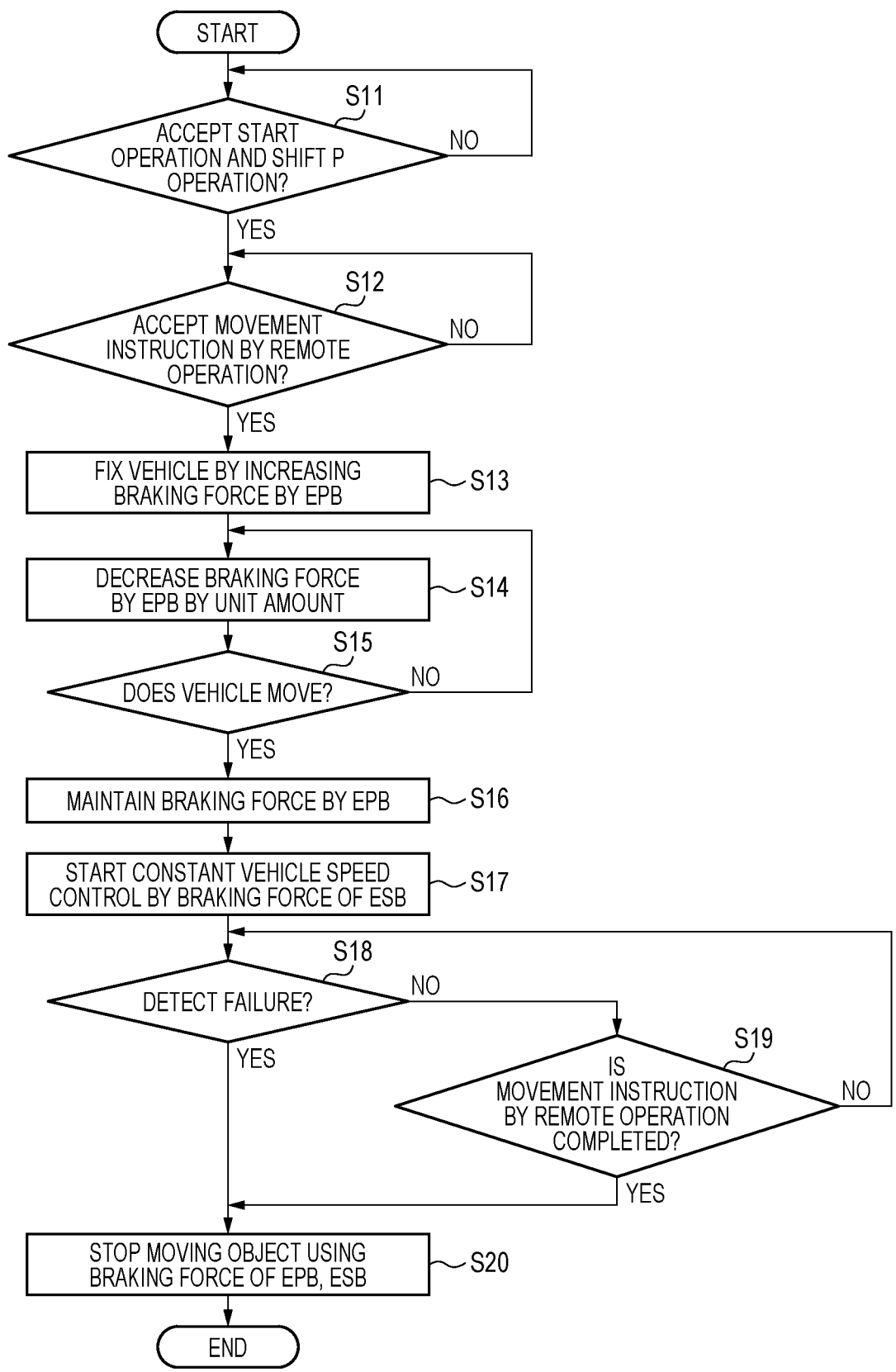
FIG. 8 is a flowchart illustrating an example of control for automatically parking a vehicle on a slope.

FIG. 8 is a flowchart illustrating an example of control for automatically parking the vehicle 10 on the slope 93. Specifically, as described in FIGS. 5 and 6, an automatic parking control of the vehicle 10 is performed when the vehicle 10 towing the trailer 90 carrying the ship 91 is retreated to a predetermined position on the slope 93 for water entry and the ship 91 enters the sea 92.

Therefore, for example, when an automatic parking button (not illustrated) of the vehicle 10 is pressed, to determine whether to execute the process, the calculation unit 52 determines whether a heavy object is connected to or mounted on the vehicle 10 and determines whether the vehicle 10 is located on a road surface with a slope. When it is determined that a heavy object is connected or mounted and the vehicle 10 is located on a sloped road surface, the calculation unit 52 starts the process. However, the process may be started based on user's instructions without making the determination by the calculation unit 52. The heavy objects include, for example, a trailer to be connected and a heavy cargo to be loaded. Whether a heavy object is connected or mounted is determined by, for example, a camera or a weight sensor. Whether the road surface is tilted is determined using, for example, a camera or a tilt sensor.

First, the calculation unit 52 determines whether an automatic parking start operation and a shift P operation to change a driving shift to a parking state are accepted (step S11). Here, it is assumed that pressing the automatic parking button is an operation to start automatic parking.

In step S11, when the start operation and shift P operation are not accepted (step S11: No), the calculation unit 52 repeats the process of step S11. In step S11, when the start operation and the shift P operation have been accepted (step S11: Yes), the calculation unit 52 determines whether an instruction to move the vehicle 10 by the remote operation has been accepted (step S12). The remote operation is, for example, an operation by the user M using the information terminal 121 from outside the vehicle 10.

In step S12, when a movement instruction by the remote operation has not been accepted (step S12: No), the calculation unit 52 repeats the process of step S12. In step S12, when a movement instruction by the remote operation is accepted (step S12: Yes), the calculation unit 52 switches the driving shift of the vehicle 10 from P (parking) to R (reverse), increases the braking force by the EPB 80, and fixes the vehicle 10 to not move on the slope 93 (step S13).

Next, the calculation unit 52 decreases the braking force by the EPB 80, which is increased in step S13, by a unit amount (step S14).

Next, the calculation unit 52 determines whether the vehicle 10 has started moving by reducing the braking force by the EPB 80 in step S14 (step S15). As illustrated in FIG. 7, the driving force 94a of the traveling direction component due to the weight of the trailer 90 carrying the ship 91, the driving force 94b in the traveling direction component due to the weight of the vehicle 10, and the creep driving force 94c due to the driving range R (reverse) of the vehicle 10 act on the vehicle 10 located on the slope 93. Therefore, as the braking force by the EPB 80 is decreased, the driving force 94a+94b+94c exceeds the braking force by the EPB 80, and the vehicle 10 begins to move in the downhill direction of the slope 93.

In step S15, when the vehicle 10 has not started moving (step S15: No), the calculation unit 52 returns to step S14 and repeats each process. In step S15, when the vehicle 10 has started moving (step S15: Yes), the calculation unit 52 maintains the braking force by the EPB 80 at the braking force when the vehicle 10 starts moving (step S16).

Next, the calculation unit 52 starts controlling the braking force of the ESB 70 so that the speed of the vehicle 10 moving in the downhill direction on the slope 93 is constant (step S17).

Next, the calculation unit 52 determines whether a failure related to movement control of the vehicle 10 has been detected (step S18). The failure related to the movement control of the vehicle 10 includes, for example, a failure of the ESB 70, a failure of a power source that supplies electric power to the ESB 70, and the like.

In step S18, when no failure is detected (step S18: No), the calculation unit 52 determines whether the instruction to move the vehicle 10 by the remote operation of the user M has been completed (step S19). Then, in step S19, when the instruction to move the vehicle 10 by remote control has not been completed (step S19: No), the calculation unit 52 returns to step S18 and repeats each process. In step S19, when the instruction to move the vehicle 10 by remote control has been completed (step S19: Yes), the calculation unit 52 stops the vehicle 10 using the braking force of the EPB 80 and the braking force of the ESB 70 (step S20).

On the other hand, when a failure is detected in step S18 (step S18: Yes), the calculation unit 52 directly proceeds to step S20, and stops the vehicle 10 by the braking force of the EPB 80 and the braking force of the ESB 70 (step S20). However, when the vehicle 10 has an ESB-related failure, the braking force of the ESB 70 may decrease or become 0 (zero). Then, the calculation unit 52 stops the vehicle 10 using only the braking force of the EPB 80. Since the braking force of the EPB 80 was being maintained at a predetermined braking force as controlled in step S16 above, the calculation unit 52 stops the vehicle 10 by increasing the braking force, which was being maintained at the predetermined value.

Figure 9:
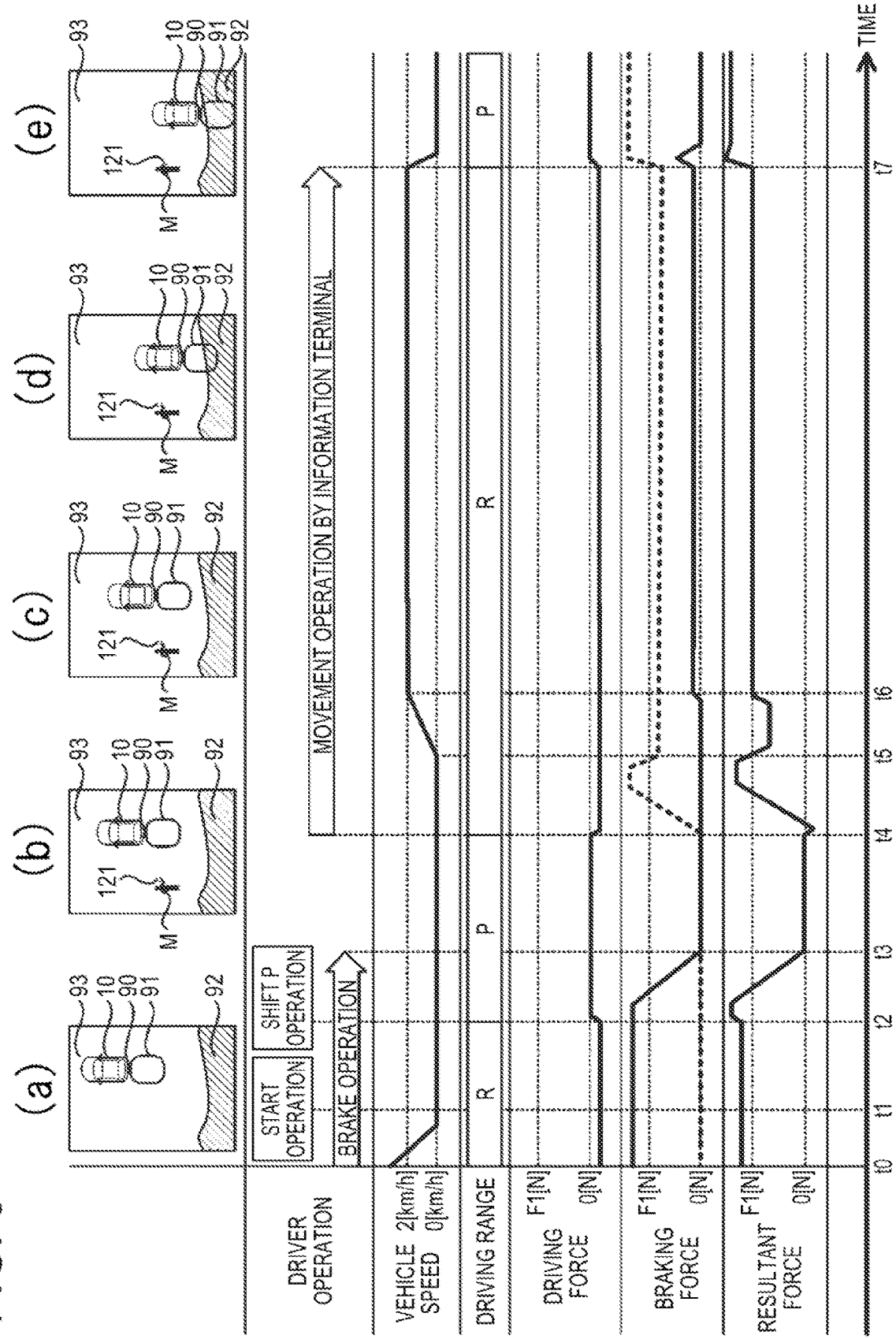
FIG. 9 is a timing chart illustrating an example of transition of a braking force when automatically parking a vehicle on a slope.

FIG. 9 is a timing chart illustrating an example of transition of the braking force when the vehicle 10 is automatically parked on the slope 93. Images taken of the vehicle 10 are overhead images (a) to (e) of the surroundings of the vehicle at a predetermined timing during automatic parking.

When arriving at the slope 93 of the sea 92 where the vehicle 10 is automatically parked (time t0), a driver (user M) sets the driving range of the vehicle 10 to R (reverse), moves the vehicle 10 so that the trailer 90 towed by the vehicle 10 is on the sea 92 side, and operates the brake to stop the vehicle 10 on the slope 93 as shown in the overhead image (a). As a result, speed of the vehicle 10 becomes 0 [km/h]. A creep driving force in a reverse direction (minus direction) is generated in the vehicle 10 due to the driving range R. The driving force is a driving force that is linked to the driving range. In the vehicle 10, a braking force of the ESB 70 exceeding F1 [N], which is a magnitude that can stop the vehicle 10 by the driver's brake operation, is generated (braking force indicated by a solid line). F1 [N] is a force that balances a driving force that is the sum of the driving force 94a due to the weight of the trailer 90 and the ship 91 and the driving force 94b due to the weight of the vehicle 10 which are applied to the vehicle 10 on the slope 93. As a result, a resultant force of the creep driving force due to the driving range R and the braking force due to the brake operation is generated in the vehicle 10. The resultant force becomes a force exceeding F1 [N].

When the vehicle 10 stops, the driver performs a start operation (time t1) of pressing the automatic parking button and a shift P operation (time t2) of changing the driving range from R to P (parking). Due to the shift P operation, the driving force of the vehicle 10 becomes 0 [N]. When the driving force becomes 0 [N], the resultant force generated on the vehicle 10 increases by an amount of change in the driving force (amount of the creep driving force of R). However, the order of the start operation and the shift P operation does not matter.

After the shift P operation is performed, the brake operation by the driver is gradually relaxed, and the braking force by the ESB 70 of the vehicle 10 decreases to 0 [N] (time t3). As the braking force decreases to 0 [N], the resultant force generated on the vehicle 10 becomes 0 [N].

The user M gets off the vehicle 10 and starts a movement operation using the information terminal 121 from outside the vehicle 10, as shown in the overhead image (b) (time t4). In a section from time t3 to time t4, the vehicle 10 is locked because the driving shift of the vehicle 10 is set to P, and thus the vehicle 10 is stopped even when the braking force is 0 [N].

When the movement operation by the information terminal 121 is started, the driving range of the vehicle 10 is switched from P to R. By switching the driving range to R, a creep driving force in the reverse direction is generated in the vehicle 10. When a movement operation by the information terminal 121 is started, the braking force by the EPB 80 (braking force indicated by a broken line) is increased to a magnitude exceeding F1 [N]. As the braking force by the EPB 80 is increased, the resultant force generated on the vehicle 10 also increases to a magnitude exceeding F1 [N], and thus the vehicle 10 is fixed in a stopped state. The operation corresponds to step S13 in FIG. 8, for example.

In the present example, the braking force of the EPB 80 is increased at the start of the movement operation by the information terminal 121 (time t4), that is, when acceptance of the movement operation is detected, but the present invention is not limited thereto. For example, the braking force of the EPB 80 may be increased to fix the vehicle 10 after the user M performs the start operation and the shift P operation inside the vehicle until the user M starts a movement operation using the information terminal 121 outside the vehicle (between time t3 and t4).

While the vehicle 10 is fixed, the braking force by the EPB 80 is decreased by a unit amount. The operation corresponds to step S14 in FIG. 8, for example.

When the braking force by the EPB 80 decreases and the resultant force generated on the vehicle 10 becomes smaller than F1 [N] (time t5), the vehicle 10 begins to move in the downhill direction of the slope 93. When the vehicle 10 starts to move, the braking force by the EPB 80 is maintained at the magnitude of the braking force when the vehicle 10 starts moving. As a result, the resultant force generated on the vehicle 10 is maintained at a magnitude below F1 [N].

The speed of the vehicle 10, which has started moving on the slope 93, gradually increases. When the speed of the vehicle 10 reaches 2 [km/h] (time t6), speed control of the vehicle 10 is started by the braking force by the ESB 70, and the speed of the vehicle 10 is maintained at 2 [km/h]. As the braking force of the ESB 70 is generated, the braking force and the resultant force generated on the vehicle 10 increase by the same amount (time t6). The resultant force is maintained at approximately the same magnitude as F1 [N] while the speed is controlled by the braking force of the ESB 70.

As illustrated in the overhead image (e), when the vehicle 10 retreats to a predetermined position, for example, to a position where the upper parts of the tires of the trailer 90 is hidden in the water, the movement operation of the information terminal 121 by the user M is completed (time t7). Upon completion of the operation of the information terminal 121, the driving range of the vehicle 10 is switched from R to P, and the driving force of the vehicle 10 becomes 0 [N]. When the operation of the information terminal 121 is completed, the braking force by the EPB 80 is increased to a magnitude exceeding F1 [N]. When the operation of the information terminal 121 is completed, the braking force by the ESB 70 is temporarily increased to assist the braking force by the EPB 80. As a result, the resultant force generated on the vehicle 10 increases to exceed F1 [N], and the speed of the vehicle 10 decreases to 0 [km/h]. The temporarily increased braking force by the ESB 70 becomes 0 [N] after the vehicle 10 stops. Accordingly, automatic parking of the vehicle 10 on the slope 93 is completed.

In the present example, when the user M arrives at the sea 92, the user directs the towed trailer 90 toward the sea 92, stops the vehicle 10 on the slope 93, and then presses the automatic parking button, but the present invention is not limited thereto. For example, when arriving at the sea 92, the user may park the vehicle 10 in a surrounding area where the vehicle 10 is to be automatically parked without specifying the direction, and then the automatic parking button may be pressed. However, here, the automatic parking button is pressed after specifying the position of the slope 93 for entering the ship 91 into water in the image displayed on the touch panel 42 of the navigation device 18. After the automatic parking button is pressed, automatic parking is performed in the same manner as above.

As described above, the control device of the present invention performs braking control in which when the vehicle 10 is moved by movement control based on the operation of the information terminal 121, after the braking force by the EPB 80 that is fixing the vehicle 10 is maintained at a value when the vehicle 10 starts moving by movement control, the moving speed of the vehicle 10 is adjusted by the braking force by the ESB 70, and then when the movement operation using the information terminal 121 is completed and the vehicle 10 is no longer moved, the braking force maintained by the EPB 80 is released and the ESB 70 and the EPB 80 performs the brake operation to stop the vehicle 10. According to the present configuration, when the vehicle 10 towing the trailer 90 is moving on the slope 93 by movement control, the braking force by the EPB 80 is maintained at a predetermined value, and when the vehicle 10 is no longer moved by movement control, the braking force maintained by the EPB 80 is released and the vehicle 10 is stopped by the ESB 70 and the EPB 80. Thus, it becomes possible to compensate for the braking force by the ESB 70 by applying a predetermined value of braking force by the EPB 80. Therefore, at the end of the movement control, the vehicle 10 can be stopped in a shorter time than when the braking force by the EPB 80 is not maintained at a predetermined value, so the vehicle 10 can be appropriately stopped at a target predetermined position.

Figure 10:
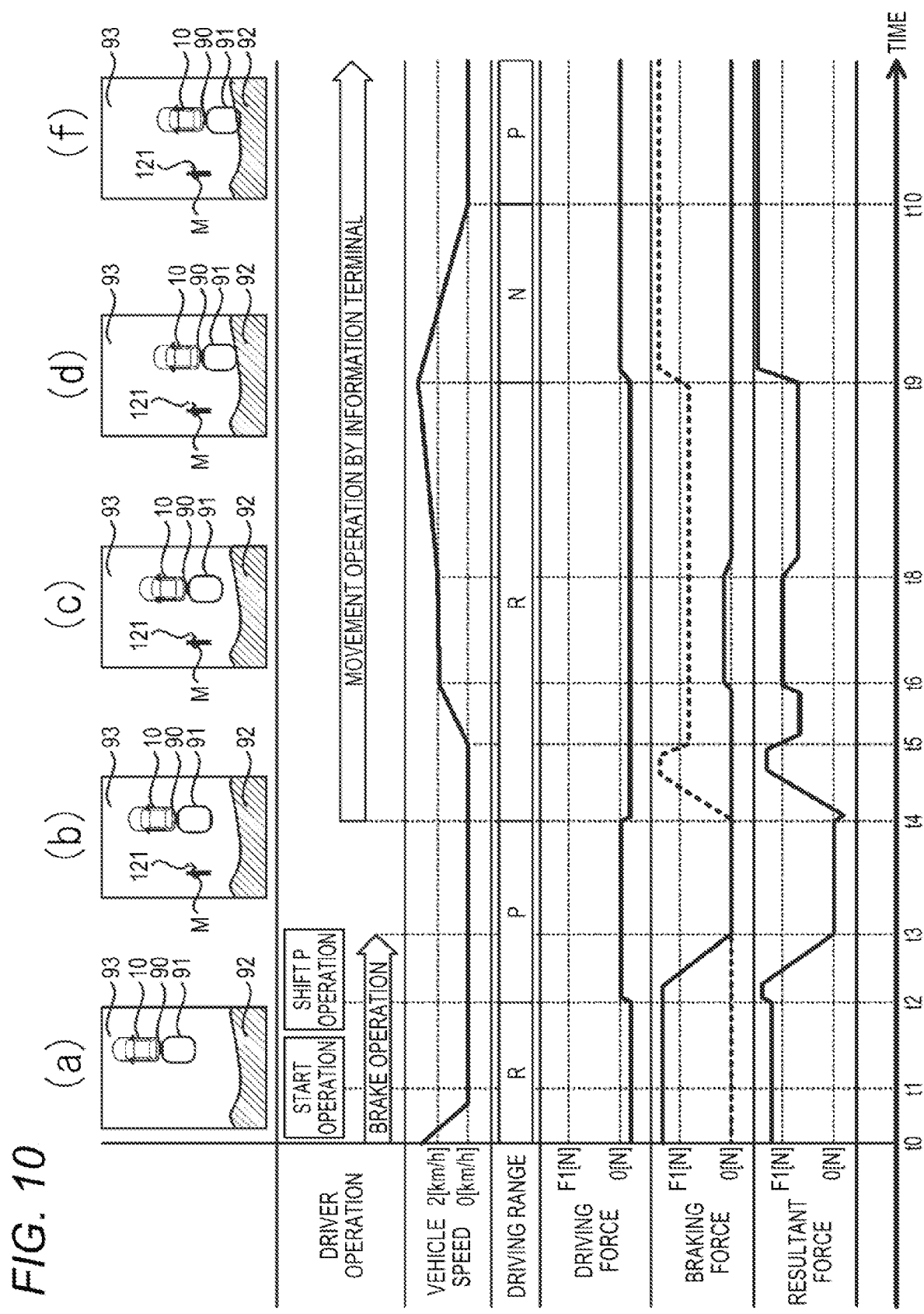
FIG. 10 is a timing chart illustrating a modification example of the transition of the braking force when automatically parking the vehicle on the slope.

FIG. 10 is a timing chart illustrating a modification example of the transition of the braking force when automatically parking the vehicle 10 on the slope 93. In the modification example of automatic parking, the transition of the braking force when a failure is detected in the vehicle 10 during automatic parking is shown.

As illustrated in FIG. 10, the transition of the braking force from time t0 to time t6 is the same as the transition of the braking force illustrated in FIG. 9.

It is assumed that while the speed of the vehicle 10 is maintained at 2 [km/h] by the braking force of the ESB 70, for example, a failure occurs in the ESB 70 or the power source and the ESB 70 becomes inoperable (time t8). Since the ESB 70 is no longer operable, the braking force generated on the vehicle 10 is reduced by the same amount, and as a result, the resultant force is reduced. Therefore, the braking force generated on the vehicle 10 is only the braking force by the EPB 80. Thus, the resultant force generated on the vehicle 10 becomes less than F1 [N], and the speed of the vehicle 10 gradually increases from 2 [km/h] by the creep driving force due to the driving range R.

When a failure of the ESB 70 or the power source is detected (time t9), the driving range of the vehicle 10 is switched from R to N (neutral). By switching the driving range to N, the driving force of the vehicle 10 becomes 0 [N]. When a failure of the ESB 70 or the power source is detected, the braking force by the EPB 80 is increased to a magnitude exceeding F1 [N]. As a result, the resultant force generated on the vehicle 10 increases to a magnitude exceeding F1 [N], and the speed of the vehicle 10 decreases (between time t9 and t10).

When the speed of the vehicle 10 becomes 0 [km/h], the driving range of the vehicle 10 is switched from N to P (time t10). As a result, as shown in the overhead image (f), the vehicle 10 stops at a position that does not reach the predetermined position, for example, at a position where the upper parts of the tires of the trailer 90 are not hidden in the water. After the vehicle 10 has stopped, even when the user M continues to perform the movement operation on the information terminal 121, the vehicle 10 does not move and automatic parking is stopped.

As such, the control device in the modification example performs the braking control in which when the vehicle 10 is moved by movement control based on the operation of information terminal 121, after the braking force by the EPB 80 that is fixing the vehicle 10 is maintained at a value when the vehicle 10 starts moving by movement control, the moving speed of the vehicle 10 is adjusted by the braking force by the ESB 70, and then when a failure occurs in the ESB 70 or the power source during automatic parking and the vehicle 10 is no longer moved by the movement control, the vehicle 10 is stopped by releasing the braking force maintained by the EPB 80 and increasing the braking force of the EPB 80. According to the present configuration, even when a failure occurs in the ESB 70 or the power source while the vehicle 10 towing the trailer 90 is moving on the slope 93 under automatic control, and the braking force by the automatically controlled ESB 70 is lost or reduced, the vehicle 10 can be stopped by increasing the braking force of the EPB 80 from a state in which a predetermined value of the braking force is applied by the EPB 80. Therefore, when a failure occurs, compared to the case where the braking force by the EPB 80 is not maintained at a predetermined value (the case where the braking force by the EPB 80 is not added), the braking force of the EPB 80 can be increased to a value at which the vehicle 10 stops in a shorter time. It becomes possible to appropriately stop the vehicle 10 at a predetermined target position.

Braking Force Control by ESB 70

Figure 11:
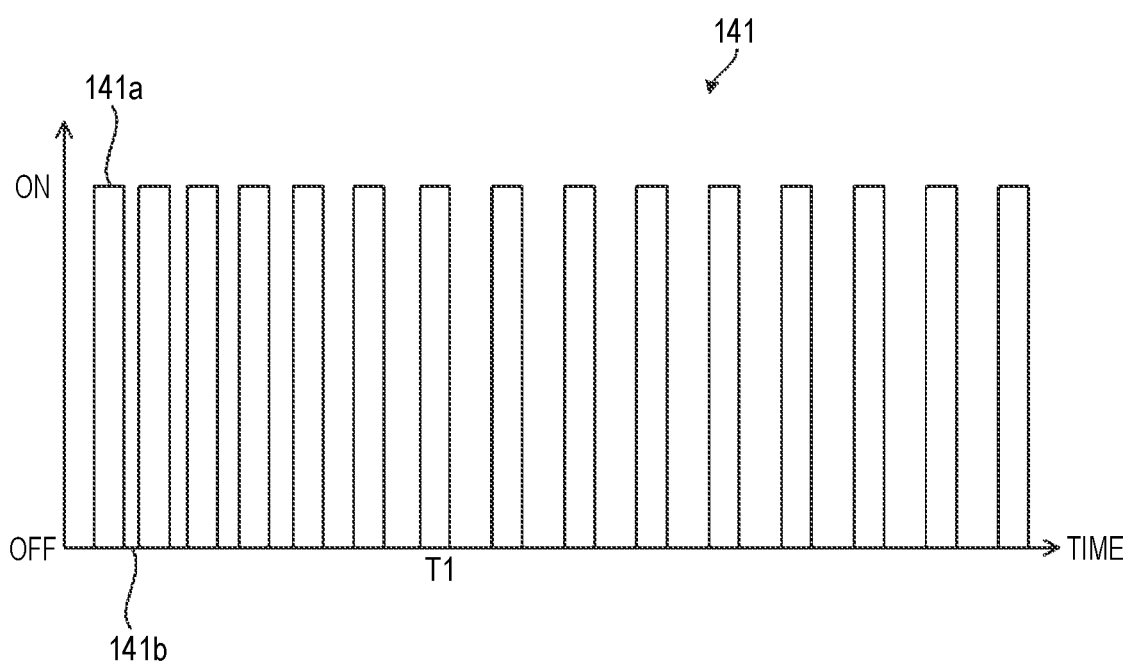
FIG. 11 is a diagram illustrating an example of braking force control by the ESB.

FIG. 11 is a diagram illustrating an example of a braking force control by the ESB 70. A configuration is described in which the EPB 80 performs control to gradually reduce the braking force that fixed the vehicle 10 and maintain the braking force when the vehicle 10 starts to move due to movement control. However, for example, when it is difficult to gradually reduce the braking force by the EPB 80, the control may be performed by the ESB 70. For example, the calculation unit 52 may increase the braking force by the ESB 70 to fix the vehicle 10 in step S13 of FIG. 8, and decrease the braking force by the ESB 70 by a unit amount in step S14 of FIG. 8.

As illustrated in FIG. 11, the braking force by the ESB 70 can be controlled by a pulse signal 141 that switches an on/off state of the piston 64. Since the ESB 70 controls the force (hydraulic pressure) applied to the brake shoe 63 by motor rotation according to the pulse signal 141, by gradually decreasing a duty ratio of the pulse signal 141, the braking force can be gradually decreased, and by maintaining the duty ratio of the pulse signal 141, the braking force can be maintained.

By gradually widening a pulse interval (gradually lengthening an off period 141b) and lowering the duty ratio, the period during which a force (hydraulic pressure) is applied to the brake shoe 63 is shortened, and the braking force by the ESB 70 is reduced (the operation corresponds to step S14 in FIG. 8). The duty ratio is lowered and, for example, when it is detected that the vehicle 10 has started moving at the duty ratio at time T1, the same duty ratio is maintained thereafter. As a result, the braking force generated by the ESB 70 due to contact between the brake shoe 63 and the brake drum 62 is maintained at the same magnitude (corresponding to steps S15 and S16 in FIG. 8).

A control method described in the embodiments described above can be implemented by executing a control program prepared in advance on a computer. The control program is recorded on a computer-readable storage medium, and is executed by being read from the storage medium. The control program may be provided in a form stored in a non-transitory storage medium such as a flash memory, or may be provided via a network such as the Internet. The computer that executes the control program may be in the control device, may be in an electronic device such as a smartphone, a tablet terminal, or a personal computer that can communicate with the control device, or may be in a server device that can communicate with the control devices and electronic devices.

Although the embodiments of the present invention are described above, the present invention is not limited to the above-described embodiments, and can be modified, improved, or the like as appropriate.

The specification describes at least the following matters. Although components corresponding to those in the above-described embodiments are shown in parentheses, the present invention is not limited thereto.

(1) A control device of a moving object (vehicle 10) that includes
a control unit (calculation unit 52) that performs movement control of the moving object,
a first braking unit (ESB 70) that adjusts moving speed of the moving object, and
a second braking unit (EPB 80) that adjusts the moving speed of the moving object and is different from the first braking unit, where
the control unit
adjusts, when the moving object is moved by the movement control, the moving speed of the moving object by a braking force of the first braking unit while applying a braking force of at least one of the first braking unit and the second braking unit that fixes the moving object, and
performs, when the moving object is no longer moved by the movement control, braking control to release the braking force of the second braking unit and stop the moving object by the first braking unit and the second braking unit.

According to (1), when the moving object is no longer moved by the movement control, the braking force applied by the first braking unit or the second braking unit is released, and the moving object is stopped by the first braking unit or the second braking unit. Therefore, even when application of the braking force of the first braking unit is delayed, it is possible to compensate by applying a braking force of the first braking unit or the second braking unit, so the moving object can be stopped in a shorter time than when no braking force is applied by the first braking unit or the second braking unit, and thus a situation in which the stopping of the moving object is delayed can be prevented.

(2) The control device according to (1), where
when the moving object is moved by the movement control, the control unit adjusts the moving speed of the moving object by the braking force of the first braking unit, after maintaining the braking force of at least one of the first braking unit and the second braking unit that fixes the moving object at a value when the moving object starts moving by the movement control.

According to (2), when the moving object is no longer moved by the movement control, the braking force applied by the first braking unit or the second braking unit is released, and the moving object is stopped by the first braking unit or the second braking unit. Therefore, even when application of the braking force of the first braking unit is delayed, it is possible to compensate by applying a braking force of the second braking unit, so the moving object can be stopped in a shorter time than when the braking force of the first braking unit or the second braking unit is not maintained, and thus a situation in which the stopping of the moving object is delayed can be prevented.

(3) The control device according to (1) or (2), where
a case where the moving object is no longer moved by the movement control includes a case where the moving object is no longer moved by the movement control due to a failure related to the movement control being detected.

As in (3), it is preferable that the braking control be performed when a failure related to the movement control occurs.

(4) The control device according to (3), where
the failure related to the movement control includes at least one of a failure of the first braking unit and a failure of a power source that supplies electric power to the first braking unit.

As in (4), it is preferable that the braking control be performed when the first braking unit fails or when the power source that supplies electric power to the first braking unit fails.

(5) The control device according to (3) or (4), where
the control unit notifies a user when the moving object is no longer moved by the movement control due to the failure related to the movement control being detected.

As in (5), when a failure related to the movement control occurs and the moving object is no longer moved, it is preferable to notify the user.

(6) The control device according to any one of (1) to (5), where
the movement control is performed by a user of the moving object by remote operation from outside the moving object, and
a case where the moving object is no longer moved by the movement control includes a case where the moving object is no longer moved by the movement control due to stoppage of the remote operation.

As in (6), it is preferable that the braking control be performed when the remote operation from the outside by the user is stopped and the moving object is no longer moved.

(7) The control device according to (2), where
when the moving object is moved by the movement control, the control unit reduces the braking force of the second braking unit that fixes the moving object, and maintains the braking force at a value when the moving object starts moving.

As in (7), the value for maintaining the braking force of the second braking unit is preferably a value when the moving object starts moving with the driving force of the moving object that opposes the braking force of the second braking unit.

(8) The control device according to any one of (1) to (7), where
the second braking unit brakes the moving object using a frictional force between a first member (brake drum 62) and a second member (brake shoe 63), and
the control unit maintains the braking force of the second braking unit by maintaining a force that brings the first member and the second member into contact with each other.

According to (8), by maintaining a contact force between the first member and the second member, the braking force of the second braking unit can be maintained.

(9) The control device according to any one of (1) to (7), where
the first braking unit brakes the moving object using a frictional force between a first member and a second member by applying a force to the second member, and
the control unit maintains the braking force of the first braking unit by maintaining a duty ratio during a period of applying a force to the second member.

According to (9), by maintaining the duty ratio of a contact period between the first member and the second member, the braking force by the second braking unit can be maintained.

(10) The control device according to any one of (1) to (9), where
the control unit fixes the moving object by increasing the braking force of the second braking unit when the moving object is no longer moved by the movement control.

According to (10), when the moving object is no longer moved by the movement control, the moving object can be stopped at a predetermined stop position by increasing the braking force of the second braking unit.

(11) The control device according to any one of (1) to (10), where
the control unit fixes the moving object by increasing the braking force of the second braking unit at start of the movement control.

As illustrated in (11), by first increasing the braking force of the second braking unit and fixing the moving object at the start of the movement control, it is possible to start the movement of the moving object smoothly, and it is easy to maintain the value of the braking force when the moving object starts moving.

(12) The control device according to any one of (1) to (11), where
after a user selects the movement control inside the moving object, the control unit increases the braking force of the second braking unit to fix the moving object.

As in (12), after the user selects the movement control inside the moving object, by increasing the braking force of the second braking unit and fixing the moving object, it is possible to smoothly start moving the moving object from a stopped state, and it is easy to maintain the value of the braking force when the moving object starts moving.

(13) The control device according to any one of claims (1) to (12), where
the control unit executes the braking control according to a determination result of whether a heavy object is connected to or mounted on the moving object.

As in (13), it is preferable that the braking control be performed when a heavy object is connected to or mounted on the moving object.

(14) The control device according to any one of (1) to (13), where
the control unit executes the braking control according to a determination result of whether the moving object is located on a road surface with a slope.

As in (14), it is preferable that the braking control be performed when the moving object is located on a road surface with a slope.

(15) The control device according to any one of (1) to (14), where
the first braking unit is an electric servo brake, and
the second braking unit is an electric parking brake.

According to (15), when the moving speed of the moving object is reduced by the electric servo brake and the electric parking brake, the moving object can be stopped at a predetermined stop position by the braking control.

(16) A control method for a control device that includes a control unit that performs movement control of a moving object, a first braking unit that adjusts moving speed of the moving object, and a second braking unit that adjusts the moving speed of the moving object and is different from the first braking unit, the control method including executing on a processor of the control device steps of:
adjusting, when the moving object is moved by the movement control, the moving speed of the moving object by a braking force of the first braking unit while applying a braking force of at least one of the first braking unit and the second braking unit that fixes the moving object, and
performing, when the moving object is no longer moved by the movement control, braking control to release the braking force of the second braking unit and stop the moving object by the first braking unit and the second braking unit.

According to (16), when the moving object is no longer moved by the movement control, the braking force applied by the first braking unit or the second braking unit is released, and the moving object is stopped by the first braking unit or the second braking unit. Therefore, even when application of the braking force of the first braking unit is delayed, it is possible to compensate by applying a braking force of the first braking unit or the second braking unit, so the moving object can be stopped in a shorter time than when no braking force is applied by the first braking unit or the second braking unit, and thus a situation in which the stopping of the moving object is delayed can be prevented.

(17) A storage medium that stores a control program for a control device that includes a control unit that performs movement control of a moving object, a first braking unit that adjusts moving speed of the moving object, and a second braking unit that adjusts the moving speed of the moving object and is different from the first braking unit, the control program including instructions for causing a processor of the control device to execute steps of:
adjusting, when the moving object is moved by the movement control, the moving speed of the moving object by a braking force of the first braking unit while applying a braking force of at least one of the first braking unit and the second braking unit that fixes the moving object, and
performing, when the moving object is no longer moved by the movement control, braking control to release the braking force of the second braking unit and stop the moving object by the first braking unit and the second braking unit.

According to (17), when the moving object is no longer moved by the movement control, the braking force applied by the first braking unit or the second braking unit is released, and the moving object is stopped by the first braking unit or the second braking unit. Therefore, even when application of the braking force of the first braking unit is delayed, it is possible to compensate by applying a braking force of the first braking unit or the second braking unit, so the moving object can be stopped in a shorter time than when no braking force is applied by the first braking unit or the second braking unit, and thus a situation in which the stopping of the moving object is delayed can be prevented.

What is claimed is:

1. A control device of a moving object comprising:
a control unit configured to perform movement control of the moving object;
a first braking unit configured to adjust moving speed of the moving object; and
a second braking unit configured to adjust the moving speed of the moving object and different from the first braking unit, the second braking unit being an electric parking brake, wherein
the control unit
gradually reduces, when the moving object stopped with a braking force of the second braking unit is moved by the movement control, the braking force of the second braking unit,
adjusts, while the moving object moves by the movement control, the moving speed of the moving object with a braking force of the first braking unit while maintaining the braking force of the second braking unit at a value when the moving object starts moving, and
performs, when the moving object is no longer moved by the movement control, braking control to release the braking force of the second braking unit from being maintained and stop the moving object by at least the second braking unit.

2. The control device according to claim 1, wherein a case where the moving object is no longer moved by the movement control includes a case where the moving object is no longer moved by the movement control due to a failure related to the movement control being detected.

3. The control device according to claim 2, wherein the failure related to the movement control includes at least one of a failure of the first braking unit and a failure of a power source that supplies electric power to the first braking unit.

4. The control device according to claim 2, wherein the control unit is configured to notify a user when the moving object is no longer moved by the movement control due to the failure related to the movement control being detected.

5. The control device according to claim 1, wherein the movement control is performed by a user of the moving object by remote operation from outside the moving object, and
a case where the moving object is no longer moved by the movement control includes a case where the moving object is no longer moved by the movement control due to stoppage of the remote operation.

6. The control device according to claim 1, wherein the second braking unit brakes the moving object using a frictional force between a first member and a second member, and
the control unit maintains the braking force of the second braking unit by maintaining a force that brings the first member and the second member into contact with each other.

7. The control device according to claim 1, wherein the first braking unit brakes the moving object using a frictional force between a first member and a second member by applying a force to the second member, and
the control unit maintains the braking force of the first braking unit by maintaining a duty ratio during a period of applying a force to the second member.

8. The control device according to claim 1, wherein the control unit fixes the moving object by increasing the braking force of the second braking unit when the moving object is no longer moved by the movement control.

9. The control device according to claim 1, wherein the control unit fixes the moving object by increasing the braking force of the second braking unit at start of the movement control.

10. The control device according to claim 1, wherein after a user selects the movement control inside the moving object, the control unit increases the braking force of the second braking unit to fix the moving object.

11. The control device according to claim 1, wherein the control unit is configured to execute the braking control when the moving object tows a trailer.

12. The control device according to claim 1, wherein the control unit is configured to execute the braking control when the moving object is located on a road surface with a slope.

13. The control device according to claim 1, wherein the first braking unit is an electric servo brake.

14. A control method for a control device that includes a control unit that performs movement control of a moving object, a first braking unit that adjusts moving speed of the moving object, and a second braking unit that adjusts the moving speed of the moving object and is different from the first braking unit, the second braking unit being an electric parking brake, the control method comprising executing on a processor of the control device steps of:
gradually reducing, when the moving object stopped with a braking force of the second braking unit is moved by the movement control, a braking force of the second braking unit,
adjusting, while the moving object moves by the movement control, the moving speed of the moving object with a braking force of the first braking unit while maintaining the braking force of the second braking unit at a value when the moving object starts moving, and
performing, when the moving object is no longer moved by the movement control, braking control to release the braking force of the second braking unit from being maintained and stop the moving object by at least the second braking unit.

15. A non-transitory computer readable storage medium that stores a control program for a control device that includes a control unit that performs movement control of a moving object, a first braking unit that adjusts moving speed of the moving object, and a second braking unit that adjusts the moving speed of the moving object and is different from the first braking unit, the second braking unit being an electric parking brake, the control program comprising instructions for causing a processor of the control device to execute steps of:
gradually reducing, when the moving object stopped with a braking force of the second braking unit is moved by the movement control, a braking force of the second braking unit,
adjusting, while the moving object moves by the movement control, the moving speed of the moving object with a braking force of the first braking unit while maintaining the braking force of the second braking unit at a value when the moving object starts moving, and
performing, when the moving object is no longer moved by the movement control, braking control to release the braking force of the second braking unit from being maintained and stop the moving object by at least the second braking unit.

16. The control device according to claim 1, wherein the movement control is performed by a user of the moving object by remote operation from outside the moving object, and the control unit is configured to execute the braking control when the moving object tows a trailer and the moving object is located on a road surface with a slope.

17. The control device according to claim 1, wherein the control unit determines whether the moving object stopped with the braking force of the second braking unit starts moving by reducing the braking force of the second braking unit, and maintains the braking force of the second braking unit at the value when the moving object starts moving.

18. The control device according to claim 17, wherein the control unit performs a control to keep the moving speed of the moving object constant by adjusting the braking force of the first braking unit after the moving object starts moving.

\* \* \* \* \*